Sept. 17, 1929.  W. L. GRAY  1,728,605
PNEUMATIC RIVET PASSER
Filed Jan. 8, 1927
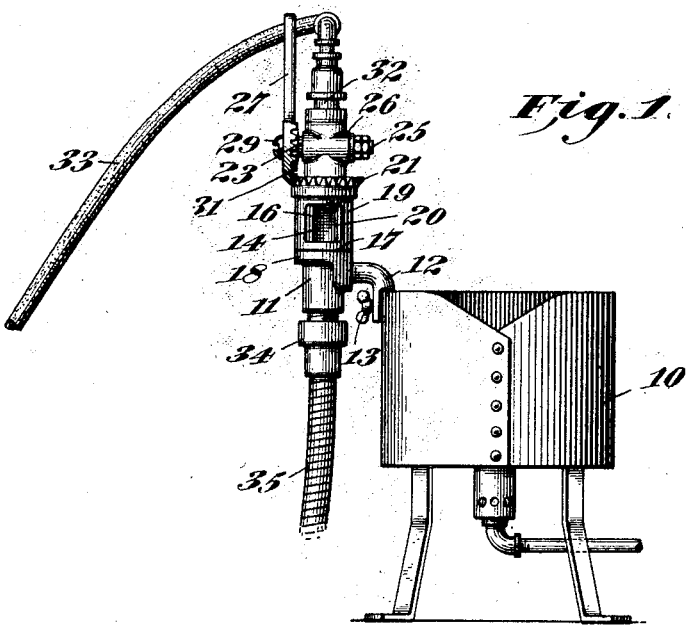
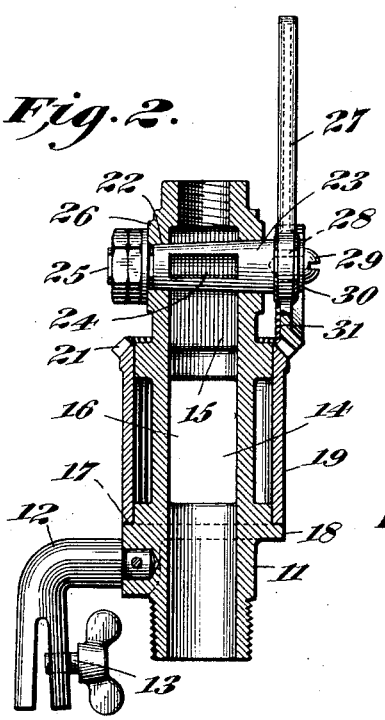
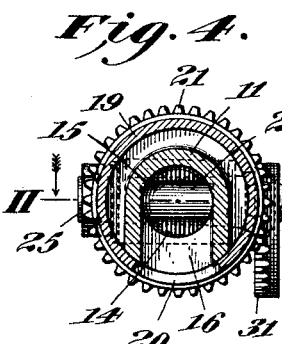
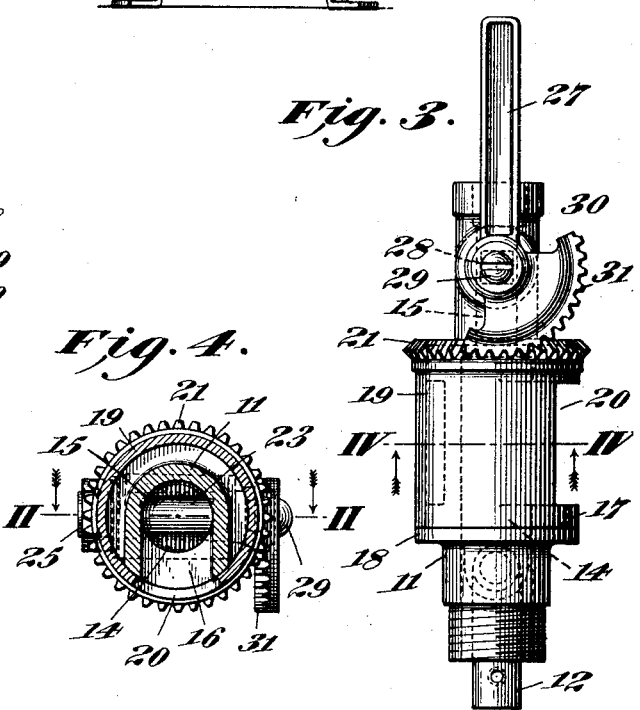
INVENTOR
*William L. Gray.*
BY
*R. S. C. Dougherty*
ATTORNEY Patented Sept. 17, 1929

1,728,605

UNITED STATES PATENT OFFICE

WILLIAM L. GRAY, OF NORTH WEYMOUTH, MASSACHUSETTS, ASSIGNOR TO BETHLEHEM SHIPBUILDING CORPORATION

PNEUMATIC RIVET PASSER

Application filed January 8, 1927. Serial No. 159,851.

My invention relates to new and useful improvements in pneumatic rivet passers.

The primary object of this invention is to provide a novel form of pneumatic rivet passer which is rugged in structure, cheap and easily manufactured and which contains a minimum number of parts. In a broader aspect my invention pertains to a rivet passer of the cylindrical type, which is adapted to be inserted directly in the air line and attached to the forge where rivets are heated.

The novel features of my invention will be more fully understood from the following description and claims taken with the accompanying drawings in which:

Fig. 1 is a side elevation of the apparatus embodying my invention;

Fig. 2 is a cross sectional view taken on line II—II, Fig. 4;

Fig. 3 is a side elevation of the rivet passer; and

Fig. 4 is a cross-sectional view taken on line IV—IV of Fig. 3.

Referring to the drawing: 10 designates a forge of any suitable construction for heating rivets. The body 11 of the rivet passer is provided with a bracket 12 bifurcated at its end to straddle the wall of the pan of the forge and is clamped thereto by means of the screw 13 threaded to the bracket. The body 11 is provided with a cylindrical chamber 14 at its lower end and a passageway 15, which is preferably rectangular in cross section and open to chamber 14. The body 11 is provided with a laterally disposed elongated opening 16, of such proportion that a rivet blank may freely pass therethrough into the chamber 14. A seat 17 is formed on the exterior surface of the body 11 and terminates at a shoulder 18 to rotatably support on outer casing 19 mounted on said body. The outer casing 19 has formed in its wall an elongated opening 20 of substantially the same dimensions as the opening 16, and so positioned with respect to each other that their respective axes coincide when the opening 20 is placed in registry with the opening 16, as hereinafter set forth. A circular row of teeth are formed at the upper end of outer casing 19 to constitute a bevel gear 21.

A tapered valve seat 22 is bored diametrically through the body 11 at a position approximately midway between the upper end of the body 11 and the chamber 14, and is adapted to receive a rotatable valve plug 23 the axis of which is in the plane of the major axis of the passageway 15. The valve plug 23 is of a diameter materially larger than the width of the passageway 15 and is provided with a rectangular lateral opening 24 which is of cross section substantially the same as the passageway 15. The end 25 of the valve plug 23 is threaded and extends beyond the face of the boss 26 formed on the body 11. A pair of nuts and a washer are mounted on the threaded end 25 for the purpose of drawing the valve plug 23 tightly to its seat 22. In order to rotate the valve plug 23 I provide an operating handle 27 having a square aperture receptive of the end 28 of valve plug 23. Suitable means is provided to retain the handle 27 in fixed relation to the valve plug 23 and for this purpose I show a machine screw 29 threaded in the end of the latter and a washer 30 mounted thereon intermediate the head of said screw and the handle 27. By rotating the valve plug 23, through the medium of the handle 27, the opening 24 may be placed in registry with passageway 15, so that compressed air may pass freely through the passageway 15 to the chamber 14, as hereinafter described. In the preferred embodiment of my invention, when said openings and said passageway are in alignment, the handle is set in a horizontal position and when the latter is turned to a vertical position the opening is disposed at right angles to the vertical axis of the passageway 15 whereby the imperforate surface of the valve plug prevents the passage of the air to the chamber 14.

Integral with the handle 27 is a bevel gear segment 31 which meshes with the gear 21 so that, upon rotation of the handle the outer casing 19 is caused to rotate upon its seat in unison with the valve plug 23. The handle 27 is arranged angularly with respect to the position of the outer casing 19 so that when the opening 24 in the valve plug 23 is at right angles to the passageway 15 the openings 20 and 16 in the outer casing 18 and the body 11 respectively are in registry. When my device is in this latter position a rivet blank may be freely passed to the chamber 14. The upper end of the body 11 is bored centrally and threaded to receive the nipple 32 of a hose 33 in order to connect the upper end of the passageway 15 with a source of compressed air supply. The lower end of the body 11 is threaded to receive a coupling 34 of a conduit 35 for the purpose of conveying the rivet to a distant point, in a manner well known to the art.

In operation, assuming the handle 27 to be in a vertical position, compressed air is contained within hose 33 and the openings 20 and 16 are in registry, a heated rivet is placed in the chamber 14. By turning the handle through approximately 90° the opening 24 in the valve plug 23 is aligned with the passageway 15, thus allowing the compressed air to pass to the chamber 14; simultaneously, due to the meshing gears 31 and 21, the outer casing 19 is rotated so that the imperforate wall of said casing closes the opening 16. By closing the latter opening the egress of the compressed air is prevented and the full force of the air is effective to propel the rivet through the conduit 35 to point of use. Upon turning the handle to its original position the air is shut off and the chamber 14 is opened for the reception of the next rivet to be passed.

From the foregoing it will be clearly seen that I have devised a rivet passer which is simple in construction, not liable to get out of order, and the parts of which are easily accessible for adjustment or replacement. And, furthermore, with a device of the character described a single movement by the operator effects the operation thereof.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and desire to secure by Letters Patent is:

1. A rivet passer, comprising a hollow body, an outer casing rotatably mounted on said body, the outer casing having a bevel gear mounted thereon, a rotary valve in said body having a gear mounted thereon and in mesh with the gear of the outer casing, and means to rotate the valve.

2. A rivet passer, comprising a body having a normally open chamber for receiving a rivet, a hose for conveying compressed air to said chamber, a rivet conveying conduit connected to said chamber, a closure for said chamber having a gear mounted thereon, a rotatable valve normally closing communication between said hose and said chamber, said valve having a gear mounted thereon, said gears being in meshed relation whereby the rotation of said valve to open position closes said chamber and the rotation of said valve to closed position opens said chamber.

3. A rivet passer, comprising a hollow body having an aperture formed therein for receiving rivets, an outer casing mounted on said body having an opening formed therein, a gear mounted on said casing, a rotary valve having a gear mounted thereon in meshed relation with the first mentioned gear, and a handle adapted to simultaneously rotate said gears.

4. A rivet passer, comprising a hollow body member, an outer casing member, said members having rivet receiving openings formed therein, said casing being rotatably mounted on said body in order to bring the openings into and out of registry with each other, a rotatable valve controlling the admission of compressed air to within said body, and means including gearing disposed between the casing and said valve, adapted to simultaneously rotate the valve and the outer casing.

5. A rivet passer, comprising a body member, a closure member having a gear mounted thereon, said members having rivet receiving openings, one of said members being turnable relative to the other to bring the openings into and out of registry, a valve housing provided with an air passage, a rotatable valve in the valve housing adapted to close the air passage, and a handle connected to said valve and having a gear integral therewith, said gear meshing with the first mentioned gear whereby movement of the handle causes the valve and the turnable casing to rotate in unison.

6. A rivet passer, comprising a body having a rivet receiving chamber formed therein and having a lateral opening formed in its wall, an outer casing rotatably mounted on said body adapted to open and close said opening, said body having a passageway communicating with said chamber, a rotatable valve for opening or closing said passageway, a gear on the outer casing, a gear on said valve in mesh with the first-mentioned gear, and means to rotate said valve.

7. In a rivet passer, a hollow body having a lateral opening formed therein, an outer casing rotatably mounted on said body having a lateral opening formed therein, a conduit for conveying fluid under pressure to within said body, a rotatable valve for preventing or permitting the passage of said fluid, a gear on the outer casing and a gear on said valve in mesh with the first-mentioned gear, whereby the rotation of said valve rotates said outer casing so that when said valve is moved to its open position said lateral opening is closed by said casing and when said valve is moved to its closed position said lateral openings are in registry to permit the passage of a rivet to within said body.

8. A rivet passer, comprising a hollow body, an outer casing rotatably mounted on said body, the outer casing having a bevel gear mounted thereon, a rotary valve in said body having a gear mounted thereon and in mesh with the gear of the outer casing, and means including said gearing to rotate the outer casing.

In testimony whereof I hereunto affix my signature.

WILLIAM L. GRAY.